July 7, 1936.  C. A. SMITH  2,047,038
AIRCRAFT WEIGHING MEANS
Filed Sept. 19, 1932  4 Sheets-Sheet 1
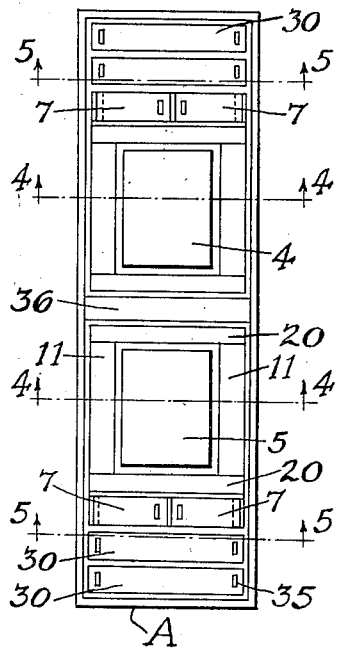
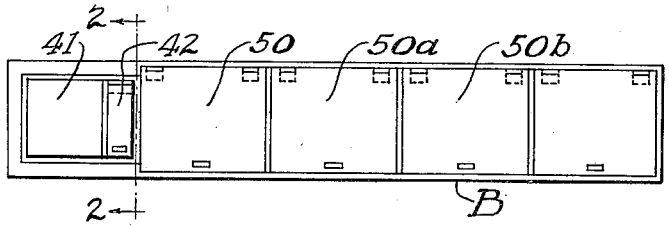
Fig. 1.
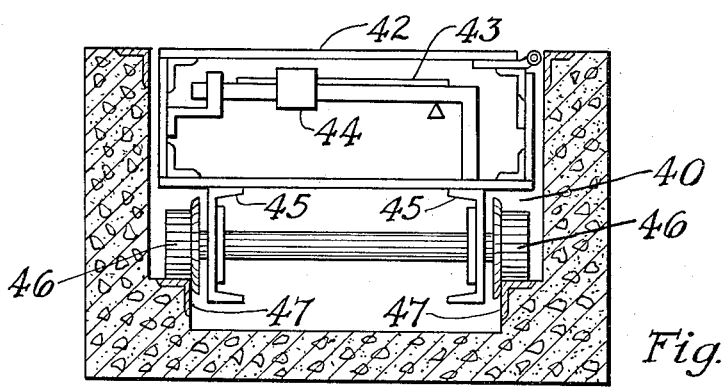
Fig. 2.
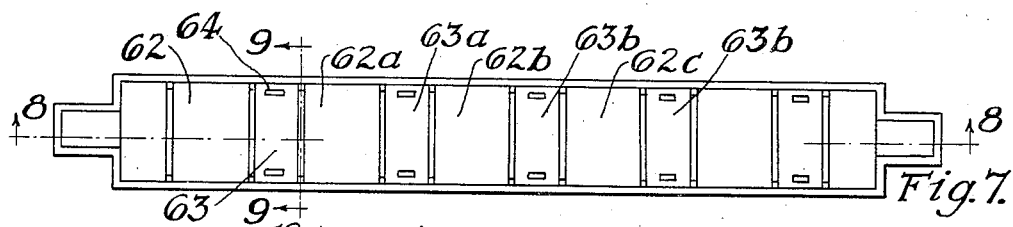
Fig. 7.
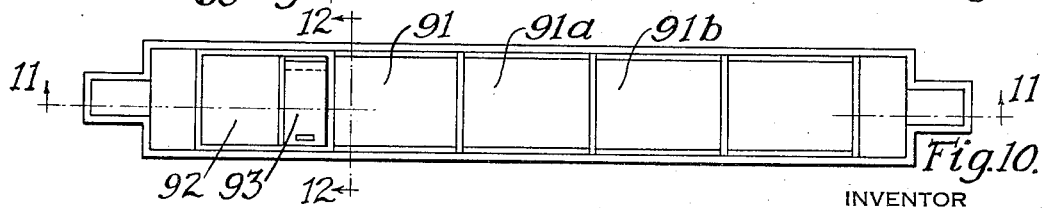
Fig. 10.
INVENTOR
Charles Allan Smith
BY
John D Morgan
ATTORNEY July 7, 1936.  C. A. SMITH  2,047,038
AIRCRAFT WEIGHING MEANS
Filed Sept. 19, 1932  4 Sheets-Sheet 2
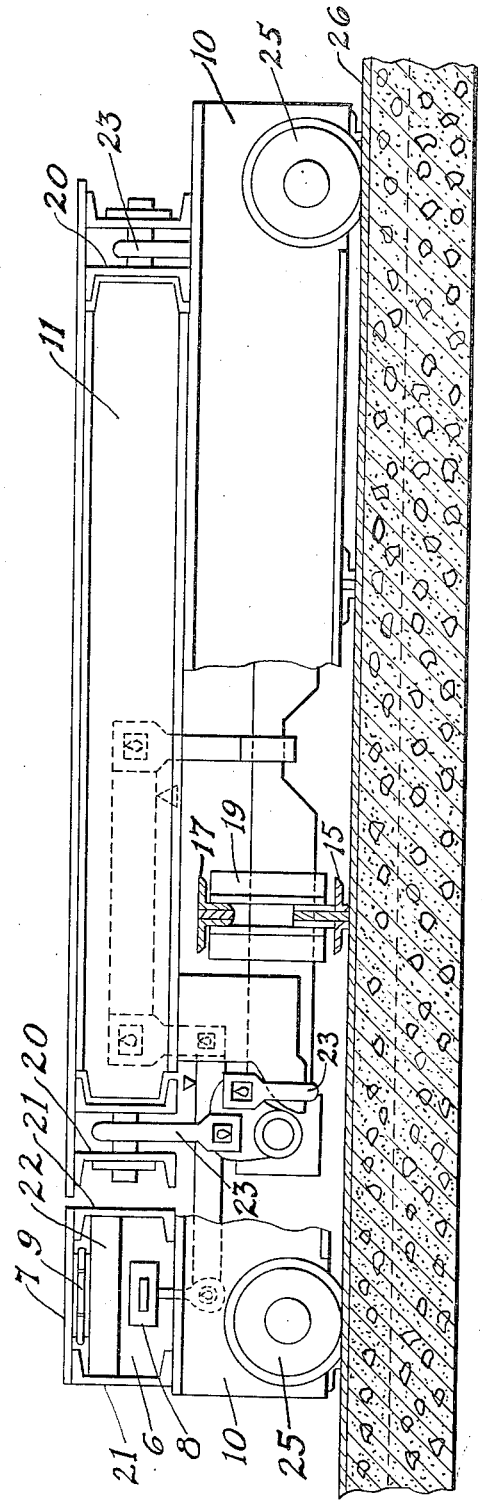
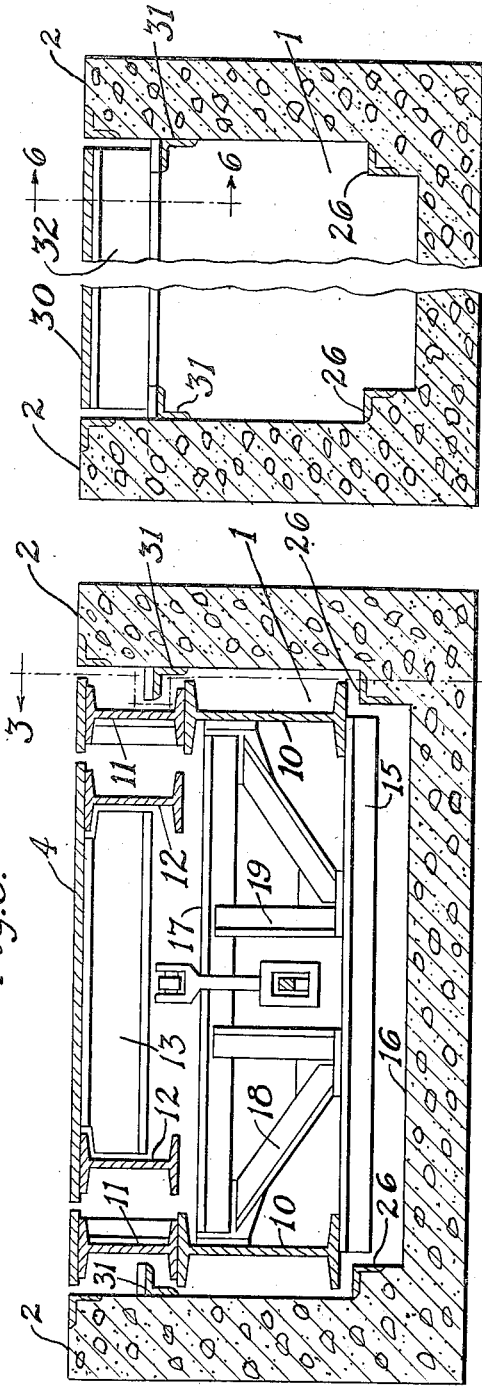
INVENTOR
Charles Allan Smith
BY
John D. Morgan
ATTORNEY July 7, 1936.  C. A. SMITH  2,047,038
AIRCRAFT WEIGHING MEANS
Filed Sept. 19, 1932  4 Sheets-Sheet 3

INVENTOR
Charles Allan Smith
BY
John D. Morgan
ATTORNEY

July 7, 1936.  C. A. SMITH  2,047,038
AIRCRAFT WEIGHING MEANS
Filed Sept. 19, 1932  4 Sheets-Sheet 4
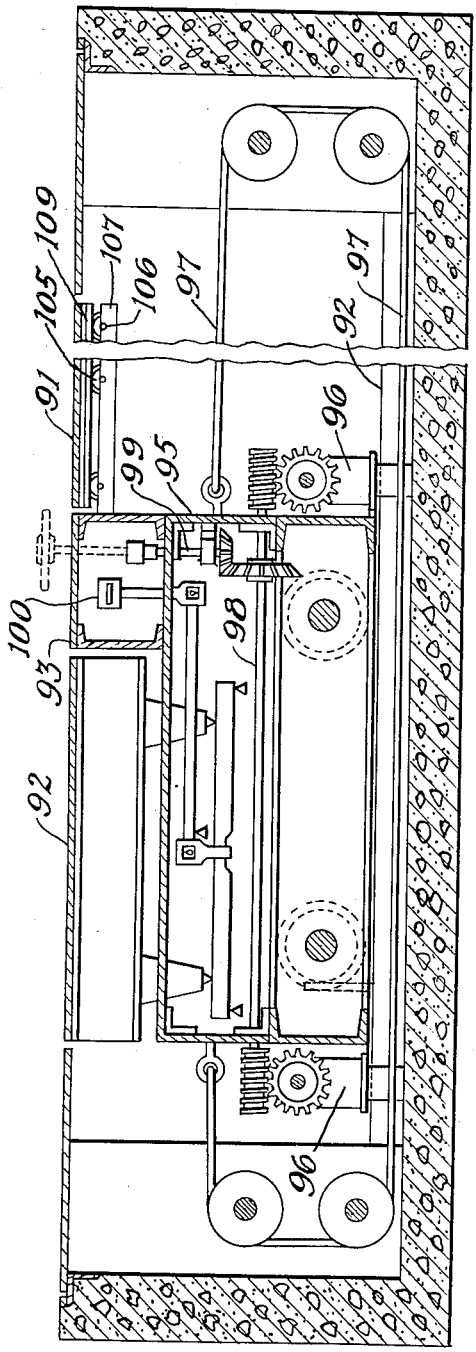
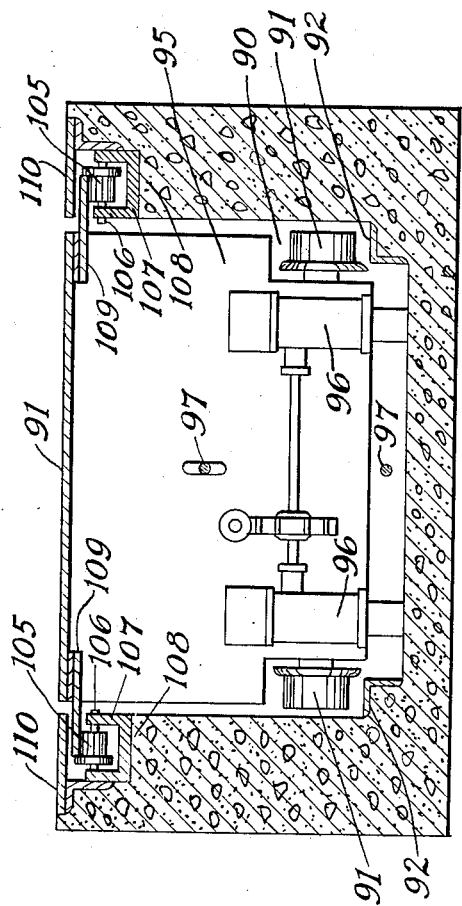
INVENTOR
Charles Allan Smith
BY
John D Morgan
ATTORNEY Patented July 7, 1936

2,047,038

UNITED STATES PATENT OFFICE 2,047,038

AIRCRAFT WEIGHING MEANS

Charles Allan Smith, Orange, N. J.

Application September 19, 1932, Serial No. 633,721

9 Claims. (Cl. 265—72)

The invention relates to air-craft weighing means and more particularly to novel and useful mechanism for weighing airplanes of conventional types.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a top plan view of a mechanism embodying the invention;

Fig. 2 is an enlarged transverse vertical section on line 2—2 of Fig. 1;

Fig. 3 is a fragmentary enlarged vertical section on line 3—3 of Fig. 4, certain parts being broken away to show interior mechanism;

Fig. 4 is an enlarged transverse vertical section on line 4—4 of Fig. 1;

Fig. 5 is an enlarged transverse vertical section on line 5—5 of Fig. 1, with parts broken away;

Fig. 7 is a top plan of a modified form of tail scale mechanism;

Fig. 10 is a top plan of another modified form of tail scale mechanism;

Fig. 11 is an enlarged central longitudinal vertical section on line 11—11 of Fig. 10, with parts broken away; and Fig. 12 is an enlarged transverse vertical section on line 12—12 of Fig. 10.

Figure 6:
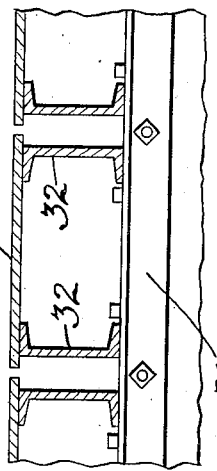
Fig. 6 is a fragmentary transverse vertical section on line 6—6 of Fig. 5.

The invention is directed to providing novel and useful means for weighing airplanes simply, quickly and efficiently. The mechanism of the invention is especially adapted for use at landing fields and hangers where large numbers of differently shaped and dimensioned airplanes must be weighed accurately and expeditiously before and/or after undertaking flight. An object of the invention is to provide mechanism which is adaptable readily and easily to receive and weigh different sizes and shapes of planes, while also providing a mechanism which is simple, durable, inexpensive and easy to construct, set up and put in operation. Furthermore, the mechanism of the invention is designed to occupy space within the hangar or on the landing field without impeding normal use of the space when the weighing mechanism is not in operation as such.

Broadly, the present preferred embodiment of the invention comprises a plurality of scales mounted in the floor of the hangar or on the landing field and disposed with respect to each other so as to conform to the general positions of the wheels and tail support of airplanes. One or more of the scales is travelable or movable so that the scale or scales may be moved to the exact loci predetermined by the positional relations of the wheels and tail supports of the particular plane which is to be weighed. Guide means are provided for directing the movable scale or scales along predetermined paths so that the scales may be moved easily and quickly to the desired positions for receiving the wheels and tail support, respectively, of the plane. Preferably the movable scales are mounted in pits or trenches so that their entire movement is at or below the level of the hangar floor or supporting surface for the airplane. This construction prevents the mechanism from impeding or interrupting the normal activities within the hangar and also permits the plane to be rolled on to the scale without any lifting or lowering movements. The trenches for containing the movable scales are preferably provided with a cover or covers which maintain the continuity of the hangar floor or the like at all times, but are so constructed that the movements of the scales can be easily and rapidly carried out.

It will be understood that the foregoing general description and the following detailed description as well are exemplary and illustrative of the invention but are not restrictive thereof.

Referring now to the present preferred embodiment of the invention, illustrated by way of example in the accompanying drawings, an illustrative embodiment of the assembled mechanism is shown in Fig. 1. As shown, the mechanism consists of two main parts or sections, one comprising the weighing means A for the wheels of an airplane and the other comprising the weighing means B for the tail-skid, tail-wheel or other tail support of the plane. As shown, the parts A and B are disposed in substantially triangular or T-shaped relation with respect to each other; that is, the major axis of the wheel-weighing means A lies transverse to the major axis of the tail-weighing means B, so that when the wheels of a plane are positioned upon the wheel scales, the tail thereof will extend along the axis of the tail-weighing means B.

The detailed construction of the wheel-weighing means A will first be described. As embodied, a trench or relatively long and narrow pit 1 is set in the floor of the hangar or in the surface of the landing field so that the top 2 of the trench walls is flush with the floor or landing surface. As shown, the trench is preferably made of concrete or other suitable material possessing the requisite qualities of strength, durability and cheapness. In the present preferred embodiment, the scales for actually supporting and weighing the wheels of the aircraft are movable along the trench 1 so as to accommodate the weighing mechanism to the spacing of the wheels of the particular airplane to be weighed. As embodied, the wheel-weighing means comprise two platform scales 4 and 5 which are mounted within the trench 1 for movement therealong.

The details of the actual weighing instrumentalities of the scales 4 and 5 are not shown, it being understood that any suitable scale construction may be provided. In general, the scales 4 and 5 are identical in construction and comprise (Figs. 3 and 4) a wheel-supporting and weight-transmitting platform 4 and a section 6 which contains the weight-indicating beam 8 along which the adjustable weights may be moved. The section 6 is preferably provided with hinged covers 7 having hinges 9 so that the covers may be lifted to set the weights and read the beam from above.

Referring now to the constructional details of the embodied means for moving or travelling the wheel scales along trench 1, the scale platform 4 (or 5) and weighing mechanism are supported on a carriage adapted to travel along the trench (Figs. 3 and 4). The carriage is of very strong construction, having lower side frames composed of I-beams 10. A plurality of stiffening trusses are disposed transversely between the main side beams 10, said trusses being provided with transverse bottom members 15 which lie slightly above the bottom 16 of the trench. The upper portions of the trusses comprise the angle members 17 which abut against the inner sides of the I-beams 10 and are supported with respect to the bottom members 15 by diagonal braces 18 and vertical members 19 suitably connected as shown. The upper portion of the carriage constitutes a rectangular framework around all sides of the platform 4 which receives the wheel of the plane. Said framework comprises the longitudinally disposed I-beams 11 and transverse end beams 20. As shown, a suitable clearance is provided between the edges of the weighing platform 4 and the inner edges of the rectangular framework 11, 20. The floating scale platform 4 (or 5) is provided with a suitable stiffening framework comprising the longitudinal I-beams 12 and the cross-members 13.

Referring to the embodied means for transmitting the weight of a wheel from platform 4 to the scale beam 8, either end of the platform is hung from the cross beams 20 by means of the U-bars 23 which are connected to a series of compound levers diagrammatically indicated in Figs. 3 and 4 which transmit the weight from the platform to the scale beam 8. The hinge 9 which is attached to the cover 7 is supported by the angle 22. Angle 22 is fastened at either end to frame members 21 which rest on the I-beams 10.

The embodied means for permitting movement of the carriage along trench 1 comprises four or more flanged wheels 25 on axles which are suitably journaled in the side beams 10. A track is provided near the bottom of the trench for receiving the wheels, said track comprising the angle members 26 set in concrete shoulders formed a suitable distance above the bottom of the trench.

The invention provides means for permitting a limited movement of the two wheel scales 4 and 5 along the trench 1, while also providing that the top of the trench be completely covered at all times. In the position shown in Fig. 1, the wheel scales 4 and 5 are closest together so as to receive relatively closely spaced airplane wheels. Between scale 5 and the left-hand end of the trench, for example, there are provided a plurality of removable cover plates 30 which bridge the top of the trench. As shown in Fig. 5, the cover plates 30 are supported at floor level by means of channels 32 resting on angle brackets 31 which project inwardly from the sides of the trench. The cover plates 30 are provided at either end with a suitable handle 35 so that they may be readily lifted out and replaced.

In utilizing the mechanism, when it is desired to move scale 5 towards the left-hand or lower end of the trench, for example, one or more of the cover plates 30 are lifted out and the scale moved along the trench the desired distance. The removed cover plates can then be inserted between the center cover member 36 of the trench and the right-hand or upper edge of movable scale 5 (as shown in Fig. 1). Ordinarily the same procedure would be carried out with respect to the companion wheel scale 4, thus spacing apart equally the two wheel scales.

Referring now to the construction of the tail-weighing mechanism B, in the form shown in Figs. 1 and 2 a trench 40 is provided, having a construction substantially the same as that of wheel scale trench 1 hereinbefore described. A movable tail-support scale is provided comprising the tail-support receiving and weight-transmitting platform 41 and the narrower section 42 which contains the weight-indicating beam 43. The section 42 is provided with a hinged cover which may be lifted to expose the beam 43 for positioning of the weight 44 and reading of the poundage indicated on the beam. The platform 41 and beam section 42 are suitably inter-connected and supported upon a moving carriage preferably by construction more or less similar to that shown and described for the wheel scale. As indicated in Fig. 2, a rectangular frame houses and supports scale section 42 upon the longitudinally disposed channel beams 45 of the carriage. The carriage is provided with two or more pairs of flanged wheels 46 which roll upon the track 47 in the sides of the trench. The pairs of wheels are interconnected by axles journaled in the carriage frame members 45 as shown.

In accordance with the invention, tail scale 41, 42 is adapted for variably positionable movement along the trench in order to accommodate the position of the scale to the location of the tail skid or other tail support of an airplane when the wheels thereof are positioned upon the wheel scales. The trench is furthermore provided with covering means which preserve the continuity of the hangar floor or the like. In the relatively simple form shown in Fig. 1, the trench is provided with a plurality of cover members 50, 50a, 50b, etc. which occupy rectangular areas equal to that of the upper surface of the tail scale 41, 42. Said cover members lie flush with the hangar floor and at the same level as the scale platform 41. As indicated, the trench covers are individually hinged at one side of the trench and are provided with handles so that any one of the covers may be raised and thus moved out of the path of the tail scale.

In determining the position at which the tail support will rest when the wheels of the plane are mounted on the wheel scale, the airplane is preliminarily manoeuvered so that the wheels rest on the wheel scales and the tail skid or tail support is placed upon the floor adjacent to the side of the trench B. The position to which the tail scale should be moved so that the tail support of the plane will rest upon the scale thus becomes apparent. Thereupon one or more of the covers 50 will be raised and laid back on the floor adjacent the trench and the scale 41, 42 will be rolled to the area vacated by one of the lifted cover plates. For example, if the tail support is found to lie over trench cover 50a, plates 50 and 50a will be raised and the scale 41, 42 rolled to the space normally occupied by cover 50a. Cover 50 may then be lowered to preserve continuity of the trench covering, except for the temporarily open space at the left-hand end normally occupied by the scale when not in use.

Figure 8:
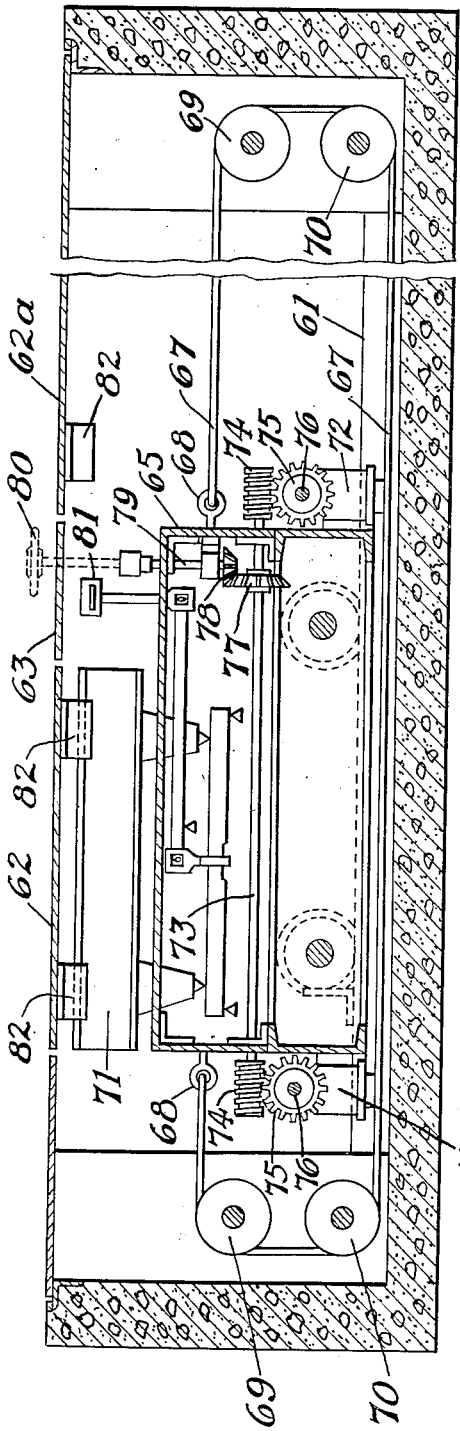
Fig. 8 is an enlarged central longitudinal vertical section on line 8—8 of Fig. 7, with parts broken away.
Figure 9:
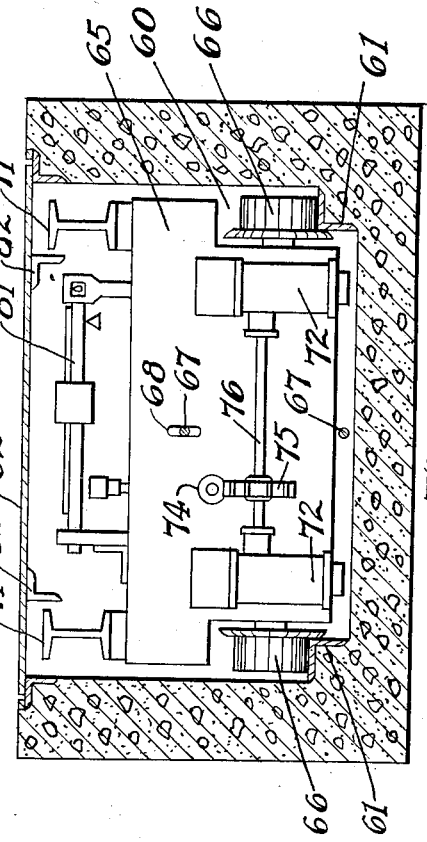
Fig. 9 is an enlarged transverse vertical section on line 9—9 of Fig. 7.

A modified form of tail-weighing mechanism is exemplarily illustrated in Figs. 7, 8 and 9. As shown, a tail-scale trench 60 is provided, said trench being essentially similar in construction to trench 40 hereinbefore described, and having tracks 61 formed near the bottoms of the side walls, as will be clear from Fig. 9.

With this embodiment of the invention, the entire top of trench 60 is surfaced with cover plates comprising the alternately spaced, relatively wide plates 62 and the intermediate, relatively narrow removable plates 63. As indicated in Fig. 9, plates 62, and plates 63 as well, rest loosely upon the top edges of trench 60, and plates 63 are provided with handles 64 so that said plates may be lifted away from the top of the trench.

A travelable scale mechanism is mounted within the trench, the lower portion of the rectangular scale frame 65 being supported by the flanged wheels 66, said wheels being journaled within the frame and adapted to roll along the tracks 61 as shown. For propelling the scale along the tracks, a cable 67 is attached to the scale frame 65 by eye bolts 68, the cable running thence around sheaves 69 and 70 at either end of the trench, the return reach of the cable running along the center of the bottom of the trench and beneath the scale frame 65. It will be clear that the scale may be rolled along the track beneath the cover plates by grasping and pulling cable 67 at any desired point in its upper reach.

With this modification of the invention, the traveling scale 65 is designed to be moved beneath one of the wide cover plates 62 and then jacked up or raised until the cover plate 62 contacts with the weight-transmitting beams 71 on top of scale frame 65. Thus plate 62 forms a floating cover plate for the scale itself, transmitting the weight of any object supported upon the cover plate direct to the scale mechanism.

For retaining the temporary scale cover plate 62 in position upon the beam 71, angle stops 82 are fastened on the under side of plates 62, 62a, etc., thus preventing any possible slippage of the plate when in its elevated position.

The embodied means for raising the frame of the scale mechanism until the tops of beams 71 contact with the bottom of plate 62 comprises four screw jacks 72 mounted at the four corners of the rectangular scale frame 65. The actuating mechanism for raising and lowering the jacks comprises a shaft 73 running the length of the frame and journaled to the ends thereof. The outer ends of the shaft 73 are provided with worms 74 which engage pinions 75. The pinions 75 are keyed to transverse shafts 76, said shafts being drivingly connected to the actuating screws of the jacks themselves. Actuating shaft 73 is provided with a bevel gear 77 which engages the horizontal bevel pinion 78. Pinion 78 is fixed to a vertically extending shaft 79 which projects through the top of frame 65 and is provided with a socket for receiving an actuating tool 80 indicated in dotted lines in Fig. 8.

In the operation of the hereinbefore described modification of the tail scale mechanism, the position of support for the tail skid or other tail support of the airplane is determined as hereinbefore described. Assuming said position to be adjacent the space occupied by cover plate 62b (Fig. 7), the adjacent narrow cover plate 63b is first lifted out of the way. The operator then grasps the upper reach of cable 67 and pulls the scale 65 along the track until the supporting beams 71 are directly beneath cover plate 62b. The tool 80 may then be inserted in the socket of shaft 79 and the jacks 72 extended until the scale frame is raised to such a point that the tops of beams 71 contact with and slightly elevate plate 62b. The open space provided by the removal of plate 63b then permits manipulation and reading of the weight-indicating beam 81 of the scale, which will be positioned therebeneath. When the weight of the tail support has been ascertained, the jacks will be lowered until the scale 65 can again roll along the track, so that it will be ready for the next operation. With this form of the mechanism it will be clear that continuity of the tail-scale trench surface is completely preserved except for the narrow space actually being used for the manipulation and reading of the scale beam.

The invention provides a third exemplary modification, illustrated in Figs. 10, 11 and 12. In this form, broadly described, the surface of tail scale trench 90 is provided with a plurality of cover plates 91 which are so mounted that they may be slid or rolled along the top of the trench. The tail scale, comprising a weight-transmitting platform 92 and a weight-indicating bar section 93, is normally positioned at one end of the trench and in such position the upper surface of the platform 92 and the platform of bar section 93 are contiguous with the surface of the cover plates 91.

As embodied, the tail scale is provided with a main frame or casing 95 which is generally similar to the casing 65 of the scale described in connection with the modification of Figs. 7, 8 and 9. The casing is mounted for traveling movement upon flanged wheels 91 which roll along tracks 92 in the sides of the trench. A cable 97 is provided for moving the scale along the tracks, said cable being mounted and operated in the same manner as cable 67 hereinbefore described. The scale casing 95 is provided with a jacking mechanism identical with that described in connection with the foregoing modification, comprising the four jacks 96, actuating shaft 98 and tool engaging shaft 99. The narrow cover 93 is hinged at one end so that it may be raised to permit access to the shaft 99 and also to expose the weight-indicating beam 100.

As already stated, the cover plates 91, 91a, etc. are mounted for sliding or rolling movement along the top of the trench. As embodied, a series of flanged rollers 105 is mounted along the upper edge of either side of trench 90. Said rollers are mounted on stub shafts 106 which are journaled at either end in the tops of U-channels 107 set in the shoulders 108 formed along the inner faces of the tops of the trench walls. The cover plates 91, 91a, etc. lie flush with the hangar floor, being slightly narrower than the open width of the trench, and having supporting extension plates 109 which are fixed to the under faces of the cover plates and project laterally to lie upon the upper surfaces of rollers 105 and abut against the flanges thereof. Roller protecting plates 110 are mounted in the top surfaces of the trench walls as shown.

In the operation of this modification of the invention, the jacks 96 normally maintain the wheels 91 above the tracks so that the scale platform 92 is flush with the cover plates 91. Thus the first operation in bringing the scale to the required tail-weighing position is to lower the jacks so that the wheels 91 will rest upon the tracks, and the platforms 92 and 93 will clear the bottoms of the extension cover plates 109. At the same time the bottoms of the jacks 96 will be raised above the bottom of the trench. When it is desired to bring platform 92 to a position such as that occupied by cover plate 91a, the scale is first lowered to the track. Thereafter, cover plates 91 and 91a are moved toward the end of the trench occupied by the scale. The operator can then grasp cable 97 and pull the scale into the area formerly covered by plate 91a and the scale is then elevated so that it is flush with the cover plates.

It will be understood that the invention broadly includes the use of one or more movable scales for supporting and weighing the weight-transmitting members of an airplane. The invention is not limited to the type of wheel scale hereinbefore exemplarily shown and described. For example, any known type of wheel scale could be used in combination with a tail scale embodying the principles of the invention as hereinbefore set forth. A wheel scale of the type disclosed in my co-pending application S. N. 530,774, filed April 17, 1931, could be used. In said application the wheel scale consisted simply of a single scale beam with a platform of a width adapted to receive the wheels of most aircraft. Similarly, a stationary tail scale, such as disclosed in my co-pending application, could be used with a wheel scale having the novel features disclosed in the present application.

In its commercial application, it should be noted that my invention permits installation and use of aircraft scales under practically any conditions, without interfering with the normal activities of the hangar or landing field. Furthermore, by virtue of the exceedingly simple construction of the device, it is possible to extend the trench or trenches containing the movable scales to any desired length in order to accommodate larger craft. On the other hand, if it becomes desirable to remove the mechanism to a different location, this can be done with only the small expense of constructing new trenches.

The invention in its broader aspects is not limited to the specific mechanisms shown and described but departures may be made therefrom within the scope of the accompanying claims without departing from the principles of the invention and without sacrificing its chief advantages.

What I claim is:—

1. In an aircraft weighing mechanism in combination a hangar floor or like surface for supporting an aircraft, a trench in said surface, a scale mounted within the trench and having its weight-receiving platform flush with said surface, means for moving the scale along the trench, and means for covering that portion of the trench not occupied by the scale platform.

2. In an aircraft weighing mechanism in combination a hangar floor or like surface for supporting an aircraft, a trench in said surface, a scale mounted within the trench and having its weight-receiving platform flush with said surface, means for moving the scale along the trench, and cover means flush with said surface for covering that portion of the trench not occupied by the scale platform so as to preserve continuity of said surface.

3. In an aircraft weighing mechanism in combination a hangar floor or like surface for supporting an aircraft, a trench in said surface, a scale mounted within the trench and having its weight-receiving platform flush with said surface, means for moving the scale along the trench, and variably positionable cover means for maintaining covered those portions of the trench not occupied by the scale platform.

4. In an aircraft weighing mechanism in combination a hangar floor or like surface for supporting an aircraft, a trench in said surface, a scale mounted within the trench and having its weight-receiving platform flush with said surface, means for moving the scale along the trench, and variably positionable cover means for maintaining covered those portions of the trench not occupied by the scale platform, said cover means comprising a plurality of hinged cover plates.

5. In an aircraft weighing mechanism in combination a hangar floor or like surface for supporting an aircraft, a trench in said surface, a scale mounted within the trench and having its weight-receiving platform flush with said surface, means for moving the scale along the trench, and variably positionable cover means for maintaining covered those portions of the trench not occupied by the scale platform, said cover means comprising a plurality of cover plates slidable along the top of the trench.

6. In an aircraft weighing mechanism in combination a hangar floor or like surface for supporting an aircraft, a trench in said surface, a scale mounted within the trench and having its weight-receiving platform flush with said surface, means for moving the scale along the trench, and variably positionable cover means for maintaining covered those portions of the trench not occupied by the scale platform, said cover means comprising a plurality of removable and interchangeable plates.

7. In an aircraft weighing mechanism in combination a hangar floor or like surface for supporting an aircraft, a trench in said surface, a scale mounted within the trench, means for covering those portions of the trench not occupied by the scale, and means for moving the cover means and the scale relatively to each other so as to permit placing of the scale at different parts of the trench and maintain the remainder of the trench covered.

8. In an aircraft weighing mechanism in combination a hangar floor or like surface for supporting an aircraft, a trench in said surface, a scale mounted within the trench, means for covering those portions of the trench not occupied by the scale, and means for moving the cover means and the scale relatively to each other so as to permit placing of the scale at different parts of the trench and maintain the remainder of the trench covered said means comprising devices for varying the level of the scale with respect to the aircraft supporting surface.

9. In an aircraft weighing mechanism in combination a hangar floor or like surface for supporting an aircraft, a trench in said surface, a scale mounted within the trench and having a weight-receiving platform flush with said surface, means for lowering the scale below said surface, means for traveling the scale along the trench in said lowered position, and means for restoring the scale to its original elevation at another position in the trench.

CHARLES ALLAN SMITH.